US009034097B2

(12) United States Patent
Wu et al.

(10) Patent No.: US 9,034,097 B2
(45) Date of Patent: May 19, 2015

(54) FIRE PROTECTION MORTAR

(71) Applicant: Promat Research and Technology Centre NV, Tisselt (BE)

(72) Inventors: Xiao Wu, Sint-Stevens-Woluwe (BE); Ann Opsommer, Koninslo (BE)

(73) Assignee: Promat Research and Technology Centre NV, Tisselt (BE)

( * ) Notice: Subject to any disclaimer, the term of this patent is extended or adjusted under 35 U.S.C. 154(b) by 0 days.

(21) Appl. No.: 14/172,388

(22) Filed: Feb. 4, 2014

(65) Prior Publication Data

US 2014/0216653 A1 Aug. 7, 2014

(30) Foreign Application Priority Data

Feb. 5, 2013 (EP) .................................... 13153960

(51) Int. Cl.
| | | |
|---|---|---|
| C04B 28/02 | (2006.01) | |
| C04B 28/04 | (2006.01) | |
| C04B 28/06 | (2006.01) | |
| C09K 21/02 | (2006.01) | |
| B05D 1/02 | (2006.01) | |
| C04B 41/50 | (2006.01) | |
| C04B 41/45 | (2006.01) | |
| C04B 28/18 | (2006.01) | |
| C04B 40/00 | (2006.01) | |
| C04B 111/00 | (2006.01) | |
| C04B 111/10 | (2006.01) | |
| C04B 111/28 | (2006.01) | |

(52) U.S. Cl.
CPC ............ *C04B 41/5027* (2013.01); *C04B 28/02* (2013.01); *C04B 28/021* (2013.01); *C04B 28/04* (2013.01); *C04B 28/06* (2013.01); *C04B 28/065* (2013.01); *C04B 2111/00146* (2013.01); *C04B 2111/00724* (2013.01); *C04B 2111/10* (2013.01); *C04B 2111/28* (2013.01); *C04B 2201/20* (2013.01); *C04B 41/4505* (2013.01); *C04B 41/4596* (2013.01); *C04B 28/18* (2013.01); *C04B 40/0064* (2013.01)

(58) Field of Classification Search
USPC ........... 106/15.05, 18.11, 814, 675, 698, 716; 252/601; 427/421.1; 264/333; 428/703
See application file for complete search history.

(56) References Cited

U.S. PATENT DOCUMENTS

| | | | | |
|---|---|---|---|---|
| 8,070,878 | B2 * | 12/2011 | Dubey | .......................... 106/713 |
| 2002/0088584 | A1 | 7/2002 | Merkley et al. | |
| 2003/0125404 | A1 | 7/2003 | Hilton et al. | |

FOREIGN PATENT DOCUMENTS

| | | |
|---|---|---|
| CN | 101092047 | 12/2007 |
| CN | 101 570 422 | 11/2009 |
| CN | 101 863 640 | 10/2010 |
| CN | 101880145 | 11/2010 |
| DE | 19501100 | 7/1996 |
| DE | 19961633 | 6/2001 |
| DE | 102008036376 | 2/2009 |
| EP | 1 001 000 | 5/2000 |
| EP | 0 986 525 | 5/2002 |
| EP | 1 326 811 | 8/2004 |
| JP | 2004224622 | 8/2004 |
| RU | 2222508 | 1/2004 |
| RU | 2269564 | 2/2006 |
| RU | 2470884 | 12/2012 |
| WO | WO-2008/004874 | 1/2008 |

OTHER PUBLICATIONS

Derwent-Acc-No. 2014-A05717, abstract of Chinese Patent Specification No. CN 103351135A (Oct. 2013).*
Eurasian Search Report.
European Search Report and Opinion dated Jul. 9, 2013.

* cited by examiner

*Primary Examiner* — Anthony J Green
(74) *Attorney, Agent, or Firm* — Venable LLP; Keith G. Haddaway; Annette K. Kwok

(57) ABSTRACT

A composition for the preparation of a fire protection mortar comprising
  45 to 70% by weight of cement binder,
  8 to 20% by weight calcite,
  8 to 20% by weight mica,
  0 to 5% by weight of xonotlite,
  0.1 to 20% by weight of expanded perlite,
  0.1 to 10% by weight of fibers,
  0.01 to 2% by weight of air entrainer and foaming agent,
  0.01 to 2% by weight of processing aids.

18 Claims, 3 Drawing Sheets

FIRE PROTECTION MORTAR

CLAIM OF PRIORITY

This application claims priority to European Patent Application No. 13 153 960.3, filed Feb. 5, 2013, which is incorporated by reference in its entirety.

TECHNICAL FIELD

The present invention relates to fire protection mortar and its use for fire protection.

TECHNICAL BACKGROUND OF THE INVENTION

The Rf RWS fire curve is used in Netherlands for tunnel fire protection. It is based on the realistic tunnel fire caused by a tank truck in a tunnel which may lead to severe concrete spalling and consequently damage tunnel stability. The tunnel concrete lining therefore must be protected to ensure public mobility and safety. During the Rf RWS test, the fire curve reaches ca 1200° C. already in ca 5 min, then progressively increase to 1350° C. in 60 min, afterwards it slowly decreases to 1200° C. at 120 min. For immersed tunnels, the test criteria allow the maximum temperature ($T_{max}$) at 380° C. on concrete surface, and only 250° C. at 25 mm inside the concrete surface. For drilled tunnels, the $T_{max}$ should not exceed 200-250° C. (cf. Both et al., TNO Centre for Fire Research, and Tan et al., Ministry of Public Works, The Netherlands). Today, this norm is also increasingly used in other countries as criteria for tunnel fire protections, such as, Belgium, Scandinavia countries, South Korea, and recently the USA. The Rf HCM condition is similar to the Rf RWS curve, applicable in France (FIG. 1).

Accordingly, the material used for tunnel fire protection must withstand the thermal shock, be resistant to abrasion necessary for tunnel cleaning, and insensitive to freeze/thaw attack. Preferably, it should be free of quartz and with low energy consumption for reasons of environmental protection and green footprint.

Only a few commercial sprays are available on the market capable of withstanding such Rf RWS condition. They are the CAFCO FENDOLITE MII of Promat, FireBarrier 135 of Thermal Ceramics and Meyco Fireshield 1350 of BASF.

EP 0 986 525 of MBT Holding discloses a spray composition comprising mainly a cementitious binder, a thermally treated shell sand and additives necessary for spray operation. The mortar is commercially available under the trade designation Meyco Fireshield 1350, with a cured density at ca 1500 kg/m³. The material can pass the Rf RWS test but at a thickness of 40 to 50 mm. The combination of high density and large thickness makes the spray operation difficult, especially when the spray has to cover complex profiles, such as steel frameworks.

EP 1 001 000 of Thermal Ceramics describes a spray which is claimed suitable for tunnels and it contains saw dust that releases smoke at high temperatures. This material has been on the market under the designation FireBarrier 135. It employs aluminate cement and kaolin, with a cured density of ca 1100 kg/m³, which is not only expensive, but also shrinks upon strong heating to such a degree that the product becomes cracked, a thick 38.5 mm has to be sprayed to survive the Rf RWS test, when tested by the TNO fire laboratory of Nederland.

Promat fire protection materials for tunnel fire protection are known on the market. EP 1 326 811 of Promat teaches a fire protection board in composition of aluminate cement, xonotlite, functional fillers and additives. It has excellent performance in Rf RWS condition, however it uses high aluminate cement as binder, the cost and energy consumption of raw materials are high. On the other hand, the CAFCO FENDOLITE® MII is a Promat spray fulfilling the Rf RWS condition. It comprises mainly of OPC and exfoliated vermiculite. This fire protection spray has been established worldwide, but supply of good vermiculite becomes increasingly difficult. Only a few vermiculite mines are known as asbestos free, their deposits are declining as result of industrial exploration, market prices are soaring.

CN 101863640 A provides an environment-friendly colored fire-proof coating for tunnels, comprising the following components in parts by mass: 10-50 parts of cement, 40-90 parts of expanded perlite, expanded vermiculite and precipitated calcium carbonate, 1-10 parts of inorganic mineral fibers, 5-30 parts of flame retardant systems, 0.1-5.0 parts of rubber powder, 0.5-3.0 parts of water reducing agents, air entraining agents and expanding agents and 0.5-2.0 parts of inorganic pigments.

The table below discloses the range described in the document. Taking the average of these ranges, the total amount is 123.5 parts which has been normalized to weight % in the last row of the table.

| Average composition of CN101863640 (A) | | | |
|---|---|---|---|
| CN101863640A | range | average total | average wt % |
| cement | 10-50 | 30 | 24.3 |
| inorganic mineral fibre | 1-10 | 5 | 4.0 |
| perlite/vermiculite/PCC (CaCO₃) | 40-90 | 65 | 52.6 |
| Al(OH)3/Mg(OH)2 | 5-30 | 17.5 | 14.2 |
| gelling agent | 0.1-5 | 2.5 | 2.0 |
| air entrainer/foaming agent/plasticizer | 0.5-3 | 2.5 | 2.0 |
| pigment | 0.5-2.0 | 1 | 0.8 |

It follows that the amount of cement after normalization to 100 weight-% is in the range of 8 to 40 weight %. This material is intended to be stable up to 1100° C.

DISCLOSURE OF THE INVENTION

It is an object of the present invention to provide with a fire protection mortar which overcomes at least some of the drawbacks of prior art.

It is a further object of the present invention to provide with a spray comprising hydraulic setting calcium silicate cement, preferably free of vermiculite, with good freeze thaw resistance and a cured density below 1200 kg/m³, preferably between 500-1000 kg/m³, as fire protection for constructions and steel structures.

The object is solved by a composition for the preparation of a fire protection mortar comprising 45 to 70% by weight of cement binder, 8 to 20% by weight of calcite, 8 to 20% by weight of mica, 0 to 5% by weight of xonotlite, 0.1 to 20% by weight of expanded perlite, 0.1 to 10% by weight of fibers, 0.01 to 2% by weight of air entrainer and foaming agent, 0.01 to 4% by weight of processing aids.

DETAILED DESCRIPTION OF THE INVENTION

Figure 1:
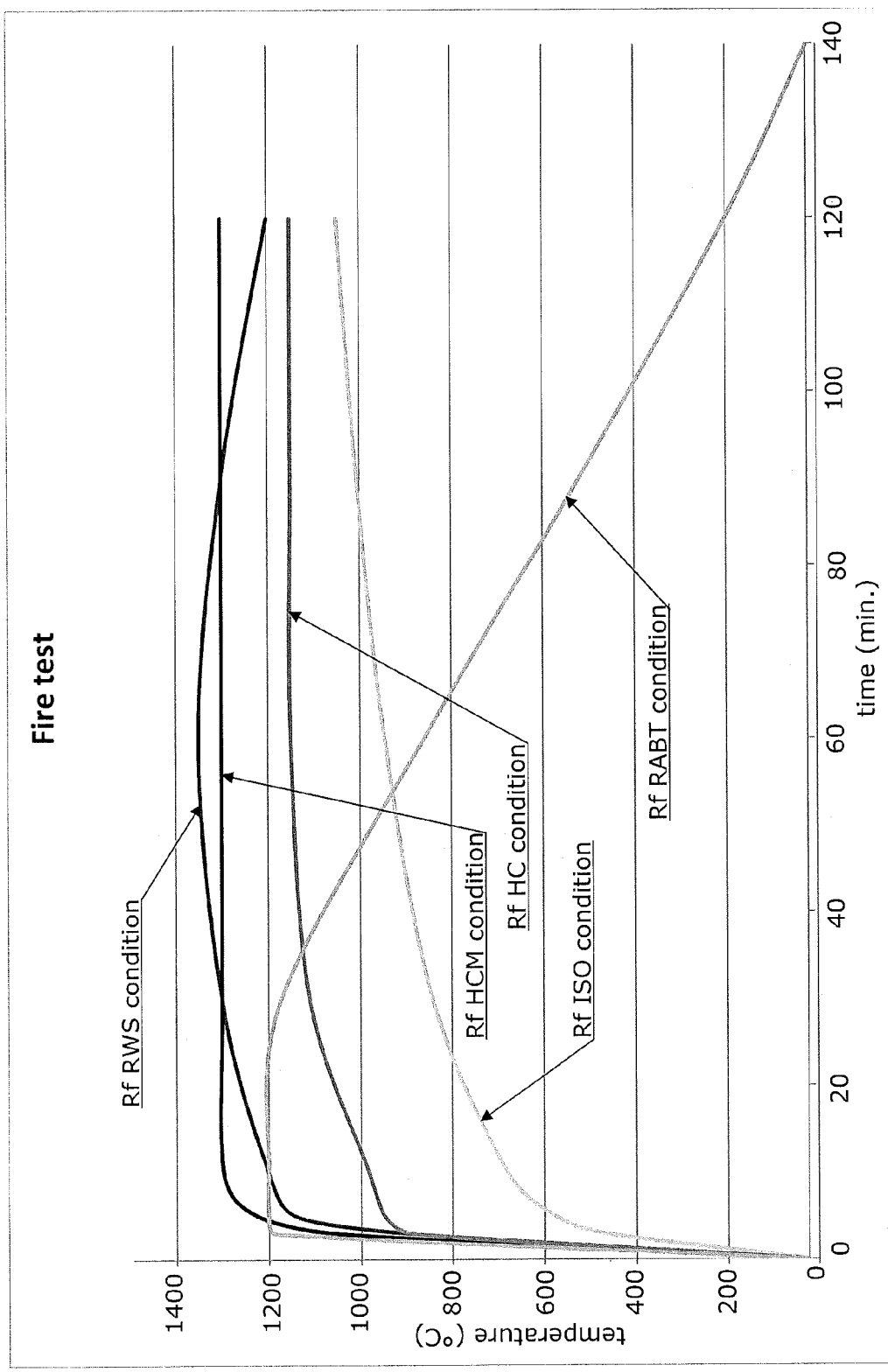
FIG. 1 shows the test conditions of various fire tests.

The product, after preparing a mortar and sprayed or casted and cured will have satisfactory mechanical properties and good freeze/thaw resistance in fully exposed condition according to EN12467. Once fired at above 1250° C., the cement, mica, and calcite react together to form refractory crystalline phases containing mainly Alite (C3S), Belite (C2S) and Gehlenite (C2AS) that are stable in the range of 1250-1400° C. and capable to provide with passive fire protection in Rf RWS condition. It demonstrates that a matrix based on cement can become a refractory during a fire test in range of 1200-1400° C. Usually, refractoriness at such high temperatures is obtained by a binder based on aluminate cement or ceramics.

The cured material according to the invention can dehydrate and/or react in a stepwise manner within a temperature range of 70-1250° C., therefore capable of absorbing the heat step by step and diminishing the heat transfer and temperature increase in the substrate to be protected.

The cement binder of the present invention can be preferably selected from the group consisting of Portland cement (CEM I), Portland composite cement (CEM II), Blastic furnace slag cement (CEM III), Pozzolanic cement (CEM IV), other Composite cement (CEM V) according to EN 197-1 and combinations thereof.

Because Ordinary Portland Cement (OPC) is made at much lower temperature than aluminate cement, it is available over the whole world, the use of the OPC reduces the cost, saves energy and reduces $CO_2$-emissions compared to the product based on aluminate cement.

Other hydraulic setting cements, such as the calcium aluminate cement and sulfur aluminate cement, can also be used in place of Portland cement of the present invention, but the costs will be higher.

The calcite of the invention includes all forms of $CaCO_3$ and its polymorphs such as Aragonite and Vaterite, it can be either grounded calcium carbonate (GCC) or precipitated calcium carbonate (PCC), used alone or in combination thereof. The $CaCO_3$ decomposes at ca 850° C. to form CaO and $CO_2$. The $CO_2$ gas has lower thermal conductivity than air at high temperatures, it improves thermal insulation. At temperature >1200° C., the CaO reacts with cement and mica to form required refractory phases. Preferred average particle size ranges up to 200 μm. If CEM II, CEM III, CEM IV or CEM V are used which contain $CaCO_3$ already, the calcite dosing of the composition should be adapted accordingly to avoid residual CaO from the high temperature reaction.

It is important to remark that hydrated lime or $Ca(OH)_2$ should not be used in the present invention. The $Ca(OH)_2$ facilitates formation of ettringite during cement hydration, which affects formation of optimal combination of C2S/C3S/C2AS refractory phases at high temperatures, leads to inferior thermal insulation and/or stability during the fire test.

The third ingredient of the invention is mica, e.g. selected from the group consisting of muscovite, phlogopite or biotite. At temperatures <1000° C., the mica leads to better mechanical properties and diminishes thermal shrinkage, at temperature >1200° C., it decomposes and reacts with cement and CaO to form the Alite, Belite and Gehlenite, therefore provides with material stability. On the other hand, this high temperature reaction consumes also large amount of energy which reduces the heat flow from fire side to the cold side. The range of mica is 8-20%, particle size is below 3 mm. Beyond of this range, either the mica shows no effect; or the sprayability will be affected.

In some embodiments, the composition comprises xonotlite, preferably not more than 5 weight %.

The xonotlite provides with both thermal insulation and thermal stability at high temperatures. It is spherical particles made by a slurry reactor in autoclaving condition as disclosed in the EP 1 326 811. However, according to the invention, needle-shaped materials may also be employed, such as, for example, the by-product in the processing of the spherical xonotlite. At high temperatures, the xonotlite dehydrates at ca 800° C. and then converts to wollastonite. This dehydration is a strongly endothermic reaction and consumes much energy. The wollastonite formed thereby has a theoretical melting point at 1530° C., it offers extra thermal stability in addition to the aforementioned refractory phases. Presence of spherical xonotlite in the invention is up to 5% by weight, in order to keep low cost and good sprayability.

Expanded perlite is a light weight agent, it has low cost and is available worldwide. At temperatures below 900° C., it reduces the spray density meanwhile helps thermal insulation; at temperature above 900° C. the perlite softens and acts as flux, promotes the solid-solid reaction among cement-CaO-Mica to form refractory phases of this invention. Preferred perlite dosing is 1-20%, packing density in range of 50-200 kg/m$^3$, particle size below 6 mm, for the best pumpability and service life of the spray machine.

Although the expanded perlite is a preferred lightweight filler, other fillers may also be used, such as, e.g. pumice, foamed glass, hollow ceramic spheres from fly ash of power plant. Exfoliated vermiculite can also be used, though not the first choice of present invention.

Further components of the composition are fibers.

The fibers of this invention play important role in the material. During spray process, presence of the fibers bridges surrounding mixture. Together with action of thixotropic agent, they effectively keep the wet spray in place, the trowel finish can easily be obtained. During curing, the fibers help to reduce setting shrinkage and avoid surface cracks from the spray. When cured, the fibers function as reinforcement to improve material durability. The fibers are selected from the group consisting of, e.g. PP fiber, PVA fiber, cellulose fiber, glass fiber including alkali resistant glass fiber, rock wool or mineral wool, steel fibers. Preferred fiber dosing is 0.1 to 10 wt.-%, fiber length is below 15 mm.

When necessary, such as, for large thickness, metal mesh or plastic mesh can be used inside of the mortar to secure a good bonding between the spray and substrate to avoid material fatigue during ageing.

Commonly used additives are present in the invention to facilitate mixing, slurry pumping, sprayability, setting regulation, and durability. They are selected from the group consisting of setting accelerator, setting retarder, super plasticizer, water retention agent, thixotropic agent, pumping aid, water repellent, and re-dispersible polymers, used alone or in combination. Commonly used additives in the field can be employed, dosing is 0.01-4%.

Air entrainer and/or foaming agent of present invention help not only mixing and slurry pumping, but also the frost resistance of cured spray by creating small capillary pores to avoid the material damage during freeze thaw cycles, when tested in fully water saturated conditions exposing to temperature change from 20° C. to −20° C. for 100 cycles, such as described by the standard EN12467. The preferred dosing is 0.01-2%.

The composition of the present invention is a powder mixture. When mixed with water, it forms a fire protection mortar. Depending on the proposed use, the viscosity of the mortar can be adjusted by adding more or less water.

Typically, the ratio of dry mix to water is 30 to 70 wt.-% dry mix and 70 to 30 wt.-% of water. For a spray application more water might be added than for the preparation of a product that is applied with a trowel or used for casting.

A further embodiment of the invention is a fire protection product which is obtained by hydraulic setting of the fire protection mortar of the invention after spraying or casting.

Once cured, the bulk density is below 1200 kg/m$^3$ and preferably between 500 and 1000 kg/m$^3$.

The material according to the invention may also be used as a repair or joint mortar to fill in broken-off or burnt-out parts of the material, ensuring the same or similar properties of whole protection areas.

Although intended as a cementitious spray, the current invention can also be used to produce a board or panel, by spray or casting, followed by further shaping to form a monolithic body by, such as, Filter press, Flow-on and Magnani process.

The cementitious mortar of present invention is intended for the most stringent fire test, such as the Rf RWS and Rf HCM condition. Obviously, it can also withstand less severe fire scenarios, such as the Rf RABT, Rf HC and Rf ISO conditions according to the standard EN 1363-1 and ISO 834-1, as illustrated in the FIG. 1.

The following non-limiting examples, further explain the invention and its embodiments.

EXAMPLE 1

The test compositions and test results are in the tables 1-2, all part by weight. The test-1 is according to present invention; the FB 135 is the commercially available product Fire Barrier 135 spray.

The ingredients of table 1 and balanced water are mixed together by a planetary mixer to form a homogeneous cementitious mortar, then sprayed into a mould by a spray machine. After 28 days curing at 20° C., key properties relevant to the fire protection, i.e., density, bending strength and thermal shrinkage at 1250° C., are tested. The results are shown in the table 2. The thermal shrinkage is the average value of length, width and thickness. It is tested by placing the test specimens in an oven, heating to required temperature and maintaining for 3 hrs. The dimension change is measured after sample cooling down to ambient conditions.

According to the table 2, thermal shrinkage of test-1 (invention) is 1%, in contrast, that of FB 135 is 12.5%. The present invention (test 1) is shown superior to prior art, in terms of remarkably improved thermal shrinkage. The thermal shrinkage at high temperature is one of key parameters for the Fire test. If it is too high, the thin spray will crack and fire will go through via the crack openings, leading to material collapse and poor thermal insulation.

TABLE 1

Example 1

| | OPC CEM I | Calcite | Mica | Fibres | Xonotlite | perlite | additives | total |
|---|---|---|---|---|---|---|---|---|
| test 1 = invention, % | 63.8 | 13.6 | 9.8 | 1.9 | 1.9 | 7.6 | 1.5 | 100.0 |
| FB 135, % | Commercial product according to EP 1 001 000 | | | | | | | |

TABLE 2

Test results

| | density g/cm$^3$ | bending strength MPa | shrinkage 1250° C./3 hrs % |
|---|---|---|---|
| test 1 = invention | 0.914 | 2.8 | 1.0 |
| FB 135 | 1.266 | 4.3 | 12.5 |

EXAMPLE 2

Two further compositions (test 3, test 4) of the present invention (see table 3) and balanced water are mixed together by a planetary mixer to form a homogeneous cementitious mortar, then sprayed on a B35 concrete slab with 150 mm thickness on ceiling by a spray machine, the spray is trowel finished to have a good surface aspect with an equal thickness of 27.5 mm. No metal meshes are used inside the spray. The B35 concrete has the minimum compressive strength of 35 MPa when cured at 28 days at 20° C.

After 40 days curing at 20° C. when weight the mortar becomes constant, density and humidity (at 105° C.) of the sprays are measured ca 850-900 kg/m$^3$ and ca 7% respectively, as shown in the Table 4.

Full scale Rf RWS tests are made by placing the concrete slab on ceiling, side by side with the Promat PROMATECT®-H board (PT-H board) at a thickness of 27.5 mm. The PT-H board is known for tunnel fire protection, it usually passes the RWS test at 27.5 mm thickness. It is used here as Benchmark.

Figure 2:
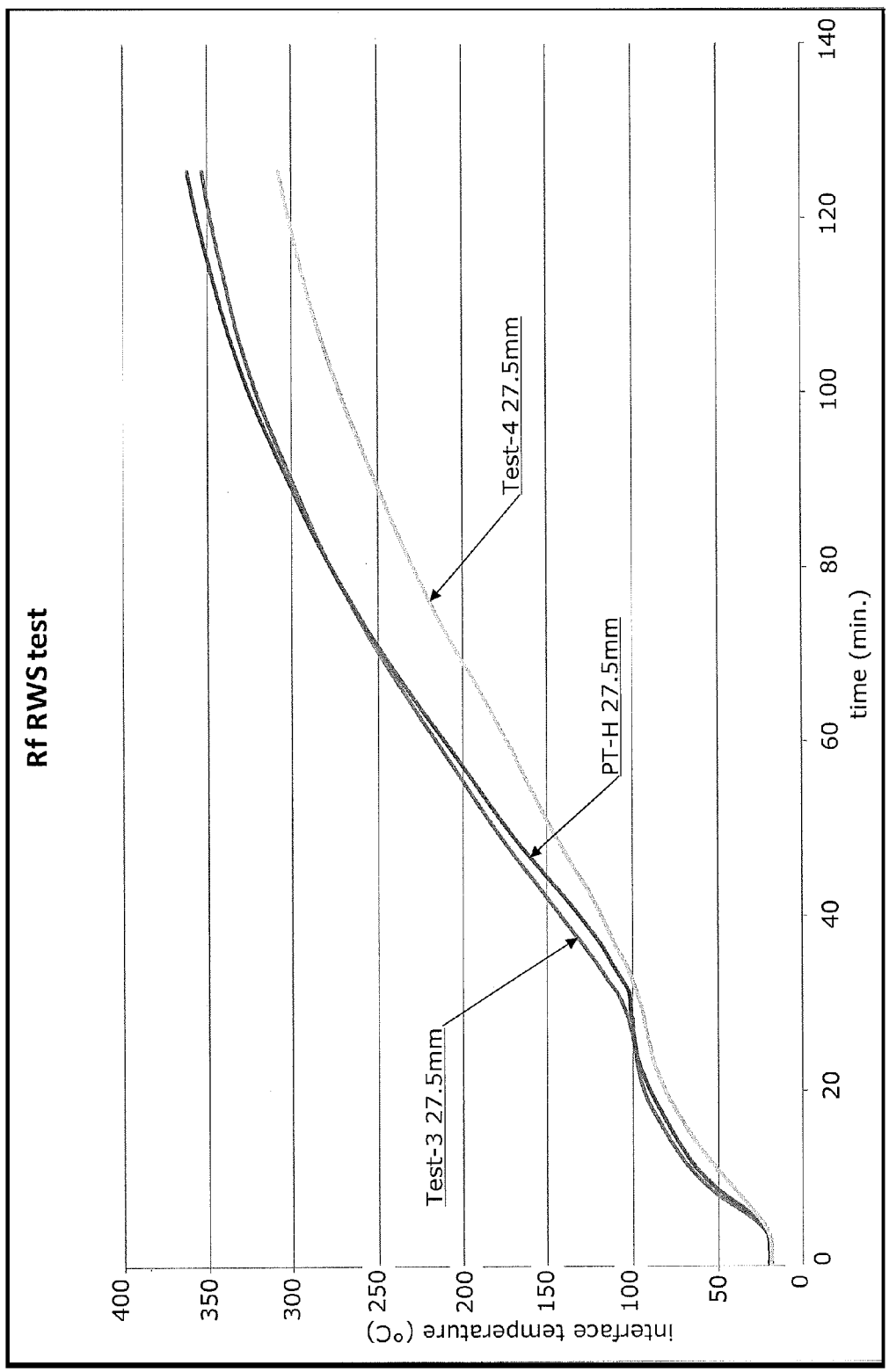
FIG. 2 shows the interface temperature of materials according to the invention and comparative materials.

The Rf RWS test (see FIG. 2) shows that the test-3 and test-4 compositions keep stable on ceiling during the whole period of fire test and even after cooling down. The maximum temperature ($T_{max}$), an average value of 5 thermal couples, is measured 356° C. for PT-H board (reference), 348° C. for the test-3, and 301° C. for the test-4 of present invention. From statistic point of view, test-3 and the PT-H board have the same thermal insulation, the test-4 can pass the Rf RWS test at equal thickness of 27.5 mm. The test-4 shows remarkably lower $T_{max}$ thanks to the effect of spherical Xonotlite, it is estimated to pass the Rf RWS test at 25 mm thickness.

After the Rf RWS test, fire side of the test-3 sample is taken and analyzed by XRD. XRD quantification program identifies crystalline phases Belite (C2S) 16.4%, Alite (C3S) 55.7%, Gehlenite (C2AS) 12.8%, others 15%. Mica, Calcite or CaO are not detected, as evidence that they have all reacted at the high temperatures. It is these refractory phases formed in situ that turn the cementitious mortar into a refractory mass with good thermal stability, that make it capable to pass the Rf RWS test with remarkably small thickness of ≤27.5 mm, compared to traditional sprays on the market.

Freeze thaw test of the test-3 composition is made according to EN12467, by placing the water saturated sample into a refrigerator, exposing temperature change from 20° C. to −20° C. per cycle, 4 cycles per day, total for 100 cycles. During the test, no surface scalling or material delamination are observed. After the frost test, bending strength of the sample is tested and results are given in the table 5. It demonstrates the material of present invention has no loss of strength during the freeze thaw cycles.

TABLE 3

Example 2

| | OPC CEM I | Calcite | Mica | Fibres | Xonotlite | perlite | additives | total |
|---|---|---|---|---|---|---|---|---|
| test 3 = invention, % | 63.8 | 13.6 | 9.8 | 1.9 | 0 | 9.5 | 1.5 | 100.0 |
| test 4 = invention, % | 63.8 | 13.6 | 9.8 | 1.9 | 1.9 | 7.5 | 1.5 | 100.0 |

TABLE 4

Results of Rf RWS test

| | Rf RWS test for 2 hrs (ceiling) | | |
|---|---|---|---|
| | density g/cm$^3$ | humidity 105° C. % | Max. temperature ° C. |
| test 3 = invention | 0.844 | 6.5 | 348 |
| test 4 = invention | 0.890 | 6.9 | 301 |
| PROMATEC-H board | 0.947 | 6.7 | 356 |

TABLE 5

Results of frost resistance test (EN12467)

| | density g/cm$^3$ | humidity 105° C. % | bending strength (MPa) after freeze thaw test EN12467 | | |
|---|---|---|---|---|---|
| | | | Ref | 25 cyc | 100 cyc |
| test 3 = invention | 0.844 | 6.5 | 1.8 | 3.6 | 3.9 |

TABLE 6

Mechanical properties

| | density g/cm$^3$ | bending strength MPa | shrinkage 1250° C./3 hrs % |
|---|---|---|---|
| test 3 = invention | 0.844 | 2.3 | 3.9 |
| test 4 = invention | 0.914 | 2.8 | 1.0 |

When xonotlite is not present (Test-3), the results are already good for the intended application and the thermal insulation is superior to an in-house board used for RWS applications in tunnels (PROMATECT-H; Tab. 6).

When xonotlite is used, the mortar can be improved further in both thermal insulation (Max temperature in Tab. 4) and thermal stability (thermal shrinkage at 1250° C. in Tab. 6). Xonotlite is a desirable component for the mortar of the invention.

EXAMPLE 3

Example 3 analyzes the properties of the product described in CN101863640 A.

The materials described in the reference are

Ordinary Portland Cement (OPC)

Calcium Aluminate Cement (CAC) and fast setting Sulphur Aluminate Cement (SAC).

As OPC is used according to the invention, this was also used for the comparative experiments.

Table 7 describes compositions prepared according to the disclosure of CN101863640 A. They are based on average formulations described in the document.

MIX-1 uses a combination of expanded perlite, exfoliated vermiculite and Precipitated Calcium Carbonate (PCC).

MIX-2 uses only expanded perlite and Precipitated Calcium Carbonate (PCC) without exfoliated vermiculite.

TABLE 7

Comparative test

| Comparison test | MIX-1 | MIX-2 |
|---|---|---|
| OPC | 24.3 | 24.3 |
| Glass fibre | 4.0 | 4.0 |
| Expanded perlite 0-2 mm | 17.6 | 35.1 |
| Exfoliated vermiculite 0-2 mm | 17.6 | 0.0 |
| Calcium carbonate, D50 = 3 μm | 17.6 | 17.6 |
| Al(OH)3 | 14.2 | 14.2 |
| gelling agent | 2.0 | 2.0 |
| foaming/plasticizer | 2.0 | 2.0 |
| pigment, Fe2O3 | 0.8 | 0.8 |
| total | 100.1 | 100.0 |

The products were prepared and cured at 20° C. for 28 days.

Table 8 compares the density and the bending strength and the shrinkage of the materials with the material Test-3 of Example 2.

TABLE 8

Results of comparison test

| | density g/cm$^3$ | bending strength Mpa | shrinkage at 1250° C. % |
|---|---|---|---|
| MIX-1 | 0.774 | 1.2 | 28.8 |
| MIX-2 | 0.665 | 1.0 | melted |
| Test-3 = Invention | 0.844 | 2.3 | 3.9 |

Figure 3:
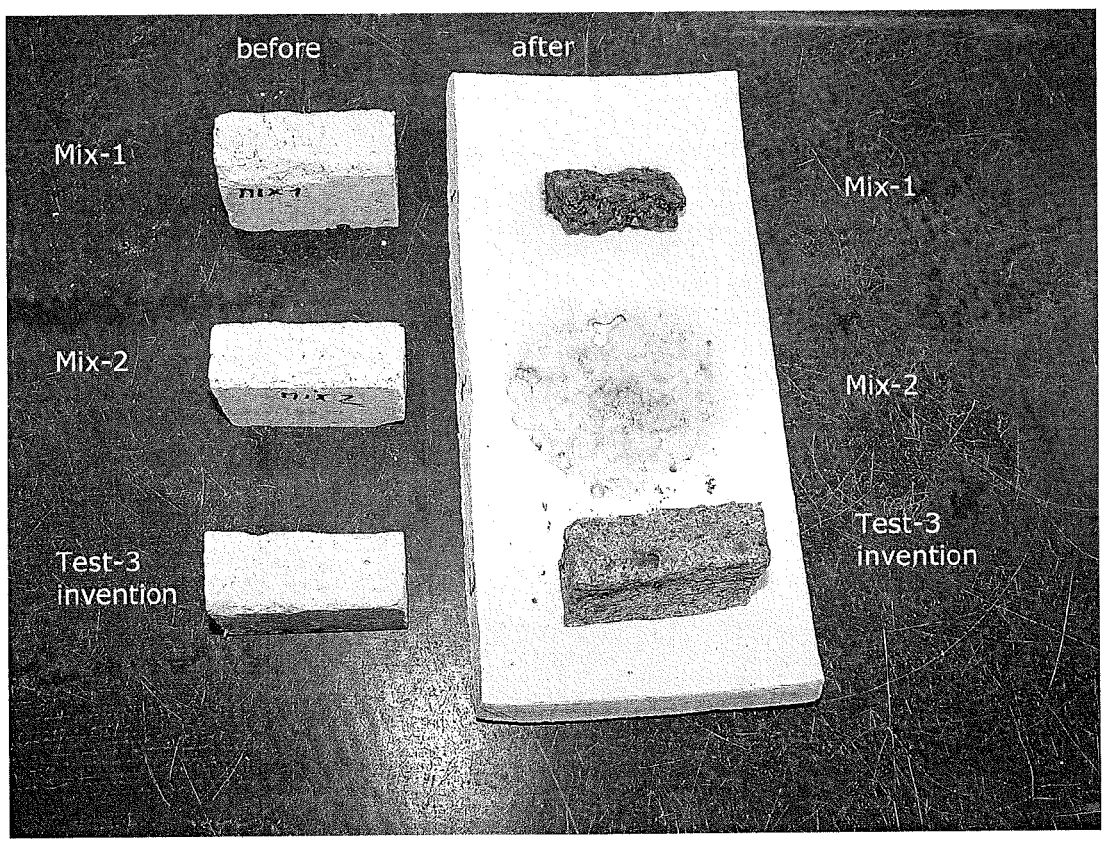
FIG. 3 shows a photo of samples before and after shrinkage test at 1250° C. for three hours. The rows are MIX-1, MIX-2 and Test-3 from Example 3. The left side samples are before the shrinkage test, right ones are after the test.

FIG. 3 shows a photo of the material after the fire test.

According to the reference, the product must be able to withstand temperatures of a hydrocarbon fire. These test conditions require resistance at 1100° C., i.e. lower than the RWS fire curve (see FIG. 1). MIX-1 and MIX-2 do not withstand the RWS fire test.

All references cited herein are incorporated by reference to the full extent to which the incorporation is not inconsistent with the express teachings herein.

The invention claimed is:

1. A composition for the preparation of a fire protection mortar comprising
   45 to 70% by weight of cement binder,
   8 to 20% by weight calcite,
   8 to 20% by weight mica,
   0 to 5% by weight of xonotlite,
   0.1 to 20% by weight of expanded perlite,
   0.1 to 10% by weight of fibers,
   0.01 to 2% by weight of air entrainer and foaming agent,
   0.01 to 4% by weight of processing aids.

2. The composition of claim 1, wherein the cement binder is selected from the group consisting of Portland cement (CEM I), Portland composite cement (CEM II), Blastic furnace slag cement (CEM III), Pozzolanic cement (CEM IV), other Composite cement (CEM V), and combinations thereof.

3. The composition of claim 1, wherein the cement binder comprises calcium aluminate cement, sulfur aluminate cement and combinations thereof.

4. The composition of claim 1, wherein the fibers are selected from the group consisting of PP fiber, PVA fiber, cellulose fiber, glass fiber, rock wool, mineral wool, steel fiber and combinations thereof.

5. The composition of claim 4, wherein said glass fiber is an alkali resistant glass fiber.

6. The composition of claim 1, wherein the processing aids are selected from the group consisting of setting retarder, setting accelerator, super plasticizer, pumping aid, water retention agent, thixotropic agent, water repellent, waterborne re-dispersible polymers and combinations thereof.

7. The composition of claim 1, wherein the fibers have an average length of less than 15 mm.

8. The composition of claim 1, wherein the calcite has a particle size (d90 by weight) of less than 200 μm.

9. A fire protection mortar comprising the composition of claim 1 and water.

10. Method for providing a fire protection system comprising spraying the mortar of claim 9 on a substrate.

11. The method of claim 10 further comprising embedding a metal or plastic mesh in the mortar.

12. A fire protection mortar comprising
    30 to 70% by weight of the composition of claim 1 and
    70 to 30% water.

13. A fire protection product obtained by spraying on a slab casting the fire protection mortar of claim 12.

14. The fire protection product of claim 13 wherein casting includes a shaping process selected from the group consisting of filter press, Flow-on and Magnani process.

15. The fire protection product of claim 13 having a bulk density below 1200 kg/m$^3$.

16. The fire protection product of claim 15, wherein the bulk density is between 500 and 1000 kg/m$^3$.

17. Method for providing a fire protection system comprising fixing the fire protection product of claim 14 on a substrate.

18. The composition for the preparation of a fire protection mortar comprising
    45 to 70% by weight of cement binder,
    8 to 20% by weight calcite,
    8 to 20% by weight mica,
    0 to 5% by weight of xonotlite,
    0.1 to 20% by weight of expanded perlite, wherein the expanded perlite is partly substituted by fillers selected from the group consisting pumice, foamed glass, expanded clay, hollow ceramic spheres of fly ashes from power plant, exfoliated vermiculite and combinations thereof,
    0.1 to 10% by weight of fibers,
    0.01 to 2% by weight of air entrainer and foaming agent,
    0.01 to 4% by weight of processing aids.

* * * * *

UNITED STATES PATENT AND TRADEMARK OFFICE
CERTIFICATE OF CORRECTION

| | | |
|---|---|---|
| PATENT NO. | : 9,034,097 B2 | Page 1 of 1 |
| APPLICATION NO. | : 14/172388 | |
| DATED | : May 19, 2015 | |
| INVENTOR(S) | : Wu et al. | |

It is certified that error appears in the above-identified patent and that said Letters Patent is hereby corrected as shown below:

In the Claims:

In claim 13, at column 10, in line 9, "or" should be added before "casting".

Signed and Sealed this
Twenty-eighth Day of June, 2016

Michelle K. Lee
*Director of the United States Patent and Trademark Office*